(12) United States Patent
Beale et al.

(10) Patent No.: US 7,415,632 B1
(45) Date of Patent: Aug. 19, 2008

(54) DETECTION AND REPAIR OF CORRUPTED CRITICAL DATA STRUCTURES WITHOUT OPERATIONAL INTERRUPTION

(75) Inventors: Andrew Ward Beale, Mission Viejo, CA (US); Jason Alan Yelinek, Diamond Bar, CA (US)

(73) Assignee: Unisys Corporation, Blue Bell, PA (US)

( * ) Notice: Subject to any disclaimer, the term of this patent is extended or adjusted under 35 U.S.C. 154(b) by 538 days.

(21) Appl. No.: 10/977,381

(22) Filed: Oct. 29, 2004

(51) Int. Cl.
*G06F 11/00* (2006.01)
(52) U.S. Cl. ......................................... 714/15; 717/101
(58) Field of Classification Search .................... 714/15, 714/16, 20, 48; 707/101, 202; 717/101, 717/202
See application file for complete search history.

(56) References Cited

U.S. PATENT DOCUMENTS

| | | | |
|---|---|---|---|
| 6,606,629 B1 * | 8/2003 | DeKoning et al. | 707/100 |
| 7,181,585 B2 * | 2/2007 | Abrashkevich et al. | 711/170 |
| 2004/0172221 A1 * | 9/2004 | Curry, III | 702/186 |

\* cited by examiner

*Primary Examiner*—Dieu-Minh Le
(74) *Attorney, Agent, or Firm*—Phuong-Quan Hoang; Robert P. Marley; Charles A. Johnson

(57) ABSTRACT

An embodiment of the invention is a technique to detect data corruption of critical data structures and to repair the corrupted critical data structures. Information data of critical data structures used by a managing module are captured upon initialization of the managing module. The captured information data are considered valid, and stored in a data vault. Critical data structures used by the managing module are monitored for validity during operation of the managing module. A corruption of a critical data structure corresponding to a stored data of the stored captured information data is detected during operation of the managing module. The corrupted data structure is restored to an operational state by using the corresponding stored data in the data vault without interrupting the operation of the managing module.

42 Claims, 11 Drawing Sheets

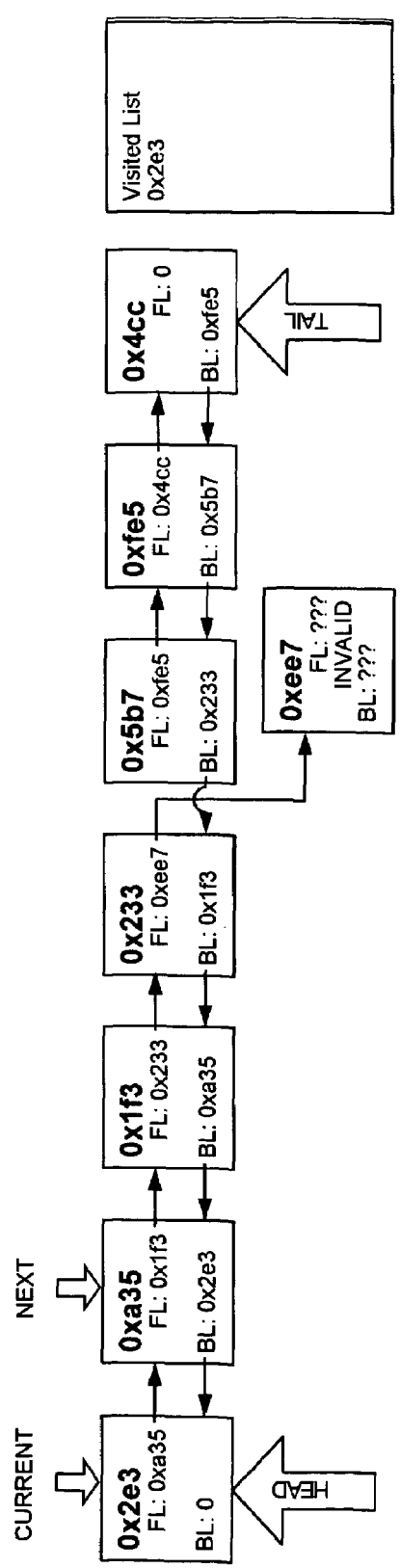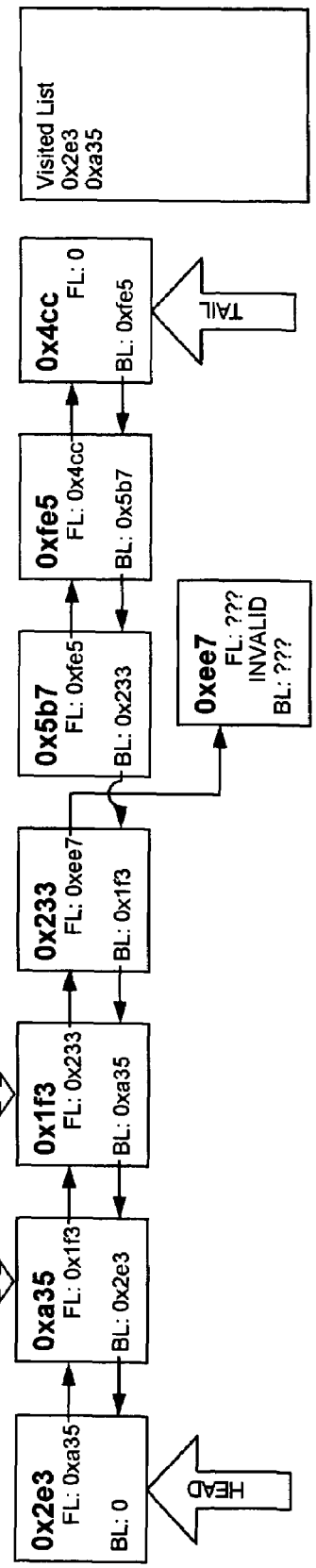
FIG. 6A
FIG. 6B

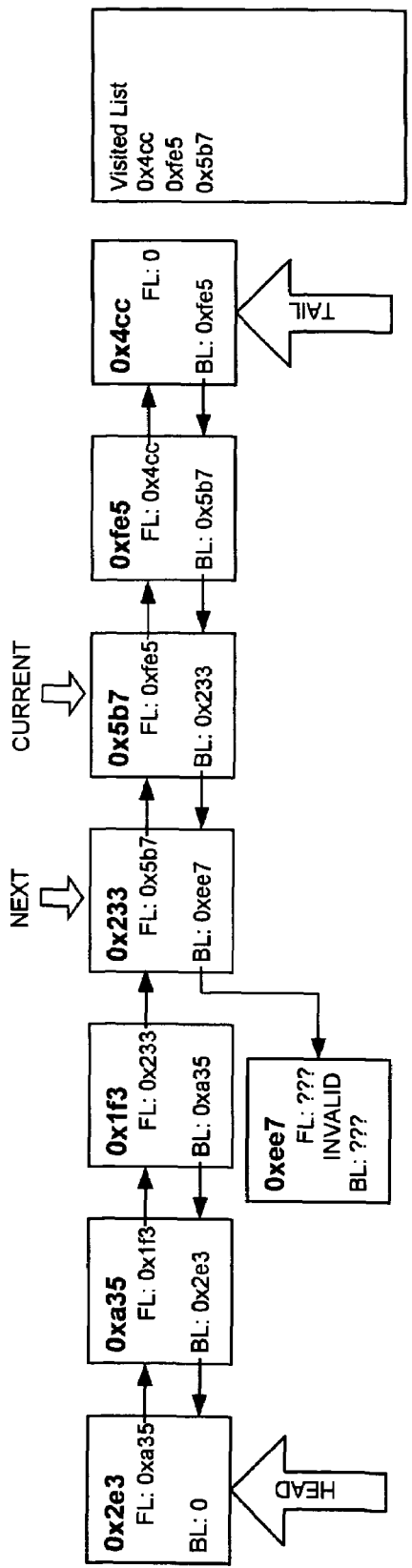
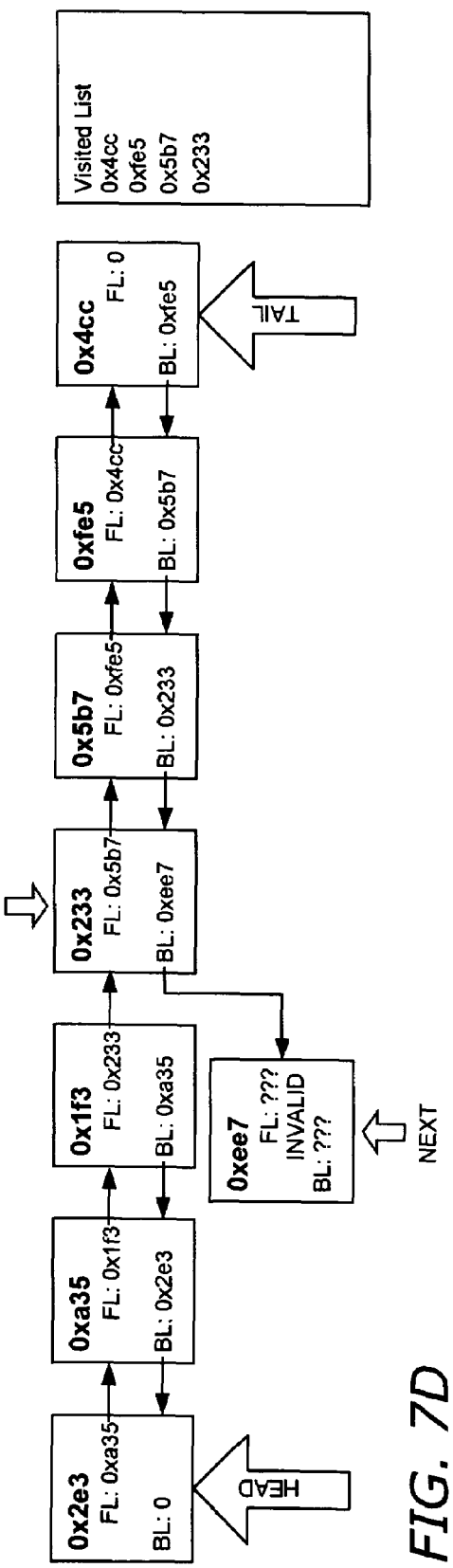
FIG. 7C
FIG. 7D

DETECTION AND REPAIR OF CORRUPTED CRITICAL DATA STRUCTURES WITHOUT OPERATIONAL INTERRUPTION

BACKGROUND

1. Field of the Invention

Embodiments of the invention relates generally to methods and systems for detecting and repairing corrupted critical data structures without an operational interruption, and in particular to methods and systems for detecting and repairing corrupted critical data structures of Input/Output queues without operational interruption of an Input/Output module.

2. Description of Related Art

Data corruptions occurring in critical data structures such as input/output queues result in system hangs and outages. In many instances, corrupted internal data structures result in total program failure. In prior systems, redundant hardware components were used to provide additional resiliency to avoid this problem of system failure. However, in some low-end servers, it is cost-prohibitive to have redundant hardware components. Furthermore, in some server configurations, even a main hardware component has been completely eliminated and replaced with a software component that emulates the hardware component. An example of a software component emulating a hardware component is the Input Output Unit (IOU), a component of the IO Module or the Resource Management Module architecture used in certain mainframe servers.

In systems where there are no redundant hardware components, without a technique that would automatically detect data corruption of critical data structures and repair the corrupted critical data structures without interrupting the operation of the module in which the critical data structures are being used, system hangs and outages as a result of data corruption are unavoidable. Thus, it is desirable to have such a technique.

SUMMARY OF THE INVENTION

An embodiment of the invention is a technique to detect data corruption of critical data structures and to repair the corrupted critical data structures. Information data of critical data structures used by a managing module are captured upon initialization of the managing module. The captured information data are considered valid, and stored in a data vault. Critical data structures used by the managing module are monitored for validity during operation of the managing module. A corruption of a data structure corresponding to a stored data of the stored captured information data is detected during operation of the managing module. The corrupted data structures are restored to an operational state by using the corresponding stored data in the data vault without interrupting the operation of the managing module.

BRIEF DESCRIPTION OF THE DRAWINGS

The invention may best be understood by referring to the following description and accompanying drawings that are used to illustrate embodiments of the invention. In the drawings:

FIGS. 6A through 6E further illustrate the forward queue traversal process as applied to an example.

FIGS. 7A through 7E further illustrate the backward queue traversal process as applied to an example.

DESCRIPTION

Figure 1:
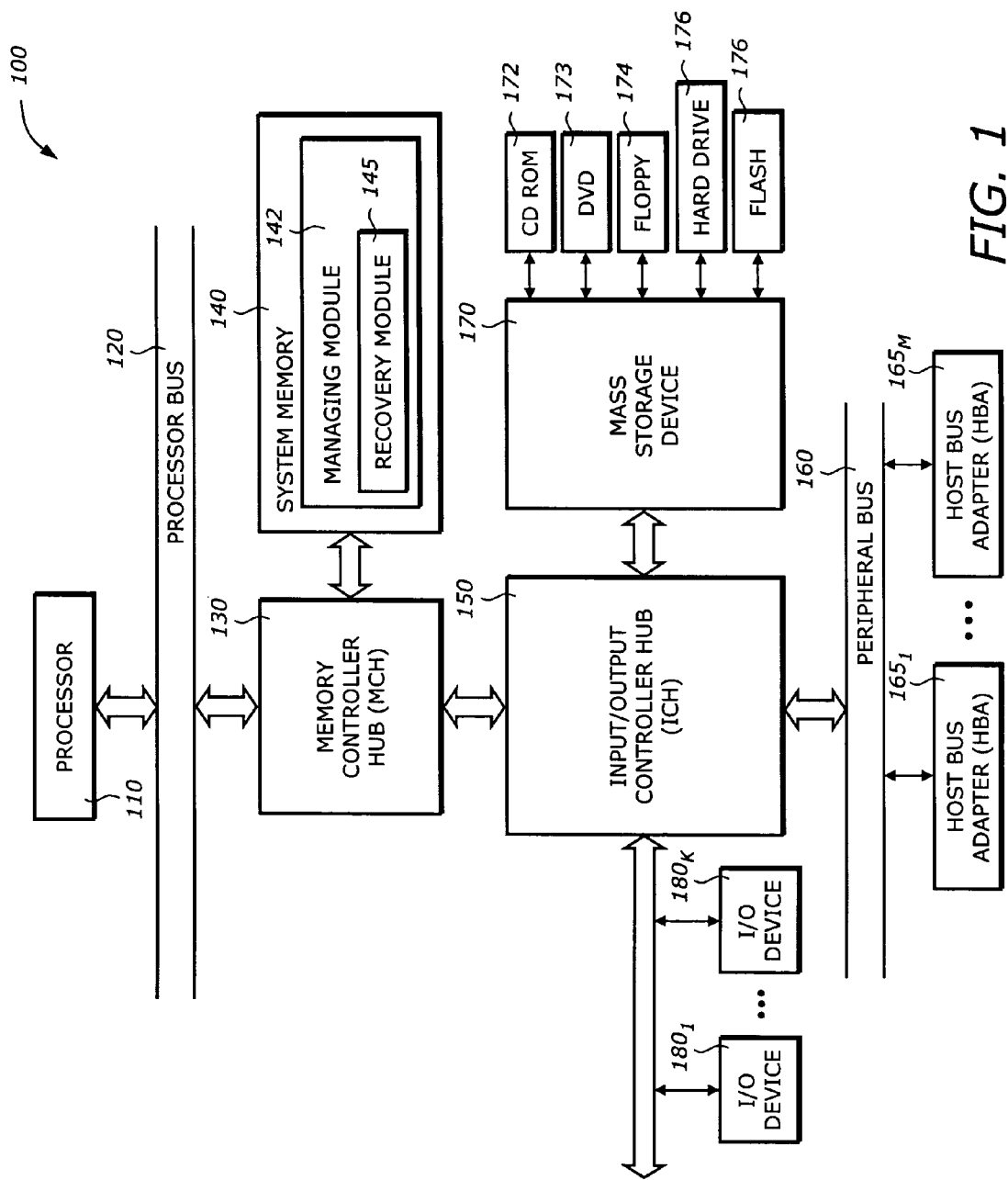
FIG. 1 is a diagram illustrating a system in which one embodiment of the invention can be practiced.

An embodiment of the invention is a technique to detect data corruption of critical data structures and to repair the corrupted critical data structures. Information data of critical data structures used by a managing module are captured upon initialization of the managing module. The captured information data are considered valid, and stored in a data vault. Critical data structures used by the managing module are monitored for validity during operation of the managing module. A corruption of a data structure corresponding to a stored data of the stored captured information data is detected during operation of the managing module. The corrupted data structures are restored to an operational state by using the corresponding stored data in the data vault without interrupting the operation of the managing module.

When employed in computer subsystems, the technique of the present invention can significantly enhance and extend the reliability of the subsystems in which the technique is implemented. The specific implementation employed may vary depending on the type of data structure being recovered, and the extent of the corruption of the data structure.

In the following description, numerous specific details are set forth. However, it is understood that embodiments of the invention may be practiced without these specific details. In other instances, well-known circuits, structures, and techniques have not been shown in order not to obscure the understanding of this description.

In one embodiment of the present invention, certain information data regarding the critical data structures are captured upon initialization of the module where the critical data structures are used. This capturing upon module initialization ensures that the data captured is valid. A checksum is computed from the captured data and the checksum is stored along with the data. The location where the captured data are stored is called the data vault. The checksum allows detection of any corruption of the data contained within the data vault subsequent to the time all the captured data are stored. The checksum is stored as the last entry in the data vault to allow for easy expansion of the data vault contents. New captured values are placed in the data vault before the checksum value is computed.

In one embodiment of the present invention, the managing module is an emulator of a hardware component. In one implementation, the managing module is an Input Output Unit (IOU), a component of the IO Module, and is used to emulate an Input Output Controller Hub. The managing module includes a recovery module that performs the operations of the method of the present invention.

Critical data structures used by the managing module during operation of the managing module are monitored for validity. If the managing module encounters a data structure that fails the necessary validity checks, the data structure may be restored to an operational state by using the corresponding captured data from the data vault.

In one implementation, the captured data in the data vault include addresses of the queues used by the managing module. These addresses include the base memory address of each of the queuing structures used for IO initiation and completion, the addresses of the queues whose addresses are not calculated from the base memory address and unit number, and the number of IO units in the system configuration.

When a data structure fails validation and it is determined that it needs to be recovered, recovery techniques tailored to the type of data structure are invoked.

FIG. 1 is a diagram illustrating a server/client system 20 in which one embodiment of the invention can be practiced. The server/client system 20 includes a processor 110, a processor bus 120, a memory control hub (MCH) 130, a subsystem memory 140, an input/output control hub (ICH) 150, a peripheral bus 160, host bus adapters (HBAs) $165_1$ to $165_M$, a mass storage device 170, and input/output devices $180_1$ to $180_K$. Note that the server/client system 20 may include more or less elements than these elements.

The processor 110 represents a central processing unit of any type of architecture, such as embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

The processor bus 120 provides interface signals to allow the processor 110 to communicate with other processors or devices, e.g., the MCH 130. The host bus 120 may support a uniprocessor or multiprocessor configuration. The host bus 120 may be parallel, sequential, pipelined, asynchronous, synchronous, or any combination thereof.

The MCH 130 provides control and configuration of memory and input/output devices such as the system memory 140, the ICH 150. The MCH 130 may be integrated into a chipset that integrates multiple functionalities such as the isolated execution mode, host-to-peripheral bus interface, memory control. The MCH 130 interfaces to the peripheral bus 160. For clarity, not all the peripheral buses are shown. It is contemplated that the subsystem 40 may also include peripheral buses such as Peripheral Component Interconnect (PCI), accelerated graphics port (AGP), Industry Standard Architecture (ISA) bus, and Universal Serial Bus (USB), etc.

The system memory 140 stores system code and data. The system memory 140 is typically implemented with dynamic random access memory (DRAM) or static random access memory (SRAM). The system memory 140 may include program code or code segments implementing one embodiment of the invention. The system memory 140 includes a managing module 142 that includes a recovery module 145. Any one of the elements of the managing module 142 may be implemented by hardware, software, firmware, microcode, or any combination thereof. The system memory 140 may also include other programs or data that are not shown, such as an operating system. The recovery module 145 contains program code that, when executed by the processor 110, causes the processor 110 to perform operations as described herein.

The ICH 150 has a number of functionalities that are designed to support I/O functions. The ICH 150 may also be integrated into a chipset together or separate from the MCH 130 to perform I/O functions. The ICH 150 may include a number of interface and I/O functions such as PCI bus interface to interface with the peripheral bus 160, processor interface, interrupt controller, direct memory access (DMA) controller, power management logic, timer, system management bus (SMBus), universal serial bus (USB) interface, mass storage interface, low pin count (LPC) interface, etc.

The HBAs $165_1$ to $165_M$ are adapters which are typically add-on cards that interface with the peripheral bus 160 or any other bus accessible to the processor 110. The HBAs may have their own processor with local memory or frame buffer to store temporary data. The protocols supported by the may be Small Computer Small Interface (SCSI), Internet Protocol (IP), and Fiber Channel (FC). The transfer rates may be hundreds of MBps with full duplex. The media may include copper and multi-mode optics.

The mass storage device 170 stores archive information such as code, programs, files, data, applications, and operating systems. The mass storage device 170 may include compact disk (CD) ROM 172, a digital video/versatile disc (DVD) 173, floppy drive 174, hard drive 176, flash memory 178, and any other magnetic or optic storage devices. The mass storage device 170 provides a mechanism to read machine-accessible media. The machine-accessible media may contain computer readable program code to perform tasks as described herein.

The I/O devices $180_1$ to $180_K$ may include any I/O devices to perform I/O functions. Examples of I/O devices $180_1$ to $180_K$ include controller for input devices (e.g., keyboard, mouse, trackball, pointing device), media card (e.g., audio, video, graphics), network card, and any other peripheral controllers.

Elements of one embodiment of the invention may be implemented by hardware, firmware, software or any combination thereof. The term hardware generally refers to an element having a physical structure such as electronic, electromagnetic, optical, electro-optical, mechanical, electromechanical parts, etc. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc that is implemented or embodied in a hardware structure (e.g., flash memory, ROM, EROM). Examples of firmware may include microcode, writable control store, micro-programmed structure. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor readable or machine accessible medium include an electronic circuit, a semiconductor memory device, a read only memory (ROM), a flash memory, an erasable ROM (EROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operations described herein. The machine accessible medium may also include program code embedded therein. The program code may include machine readable code to perform the operations described in the following. The term "data" here refers to any type of information that is encoded for machine-readable purposes. Therefore, it may include program, code, data, file, etc.

All or part of an embodiment of the invention may be implemented by hardware, software, or firmware, or any combination thereof. The hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

One embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, etc.

Figure 2:
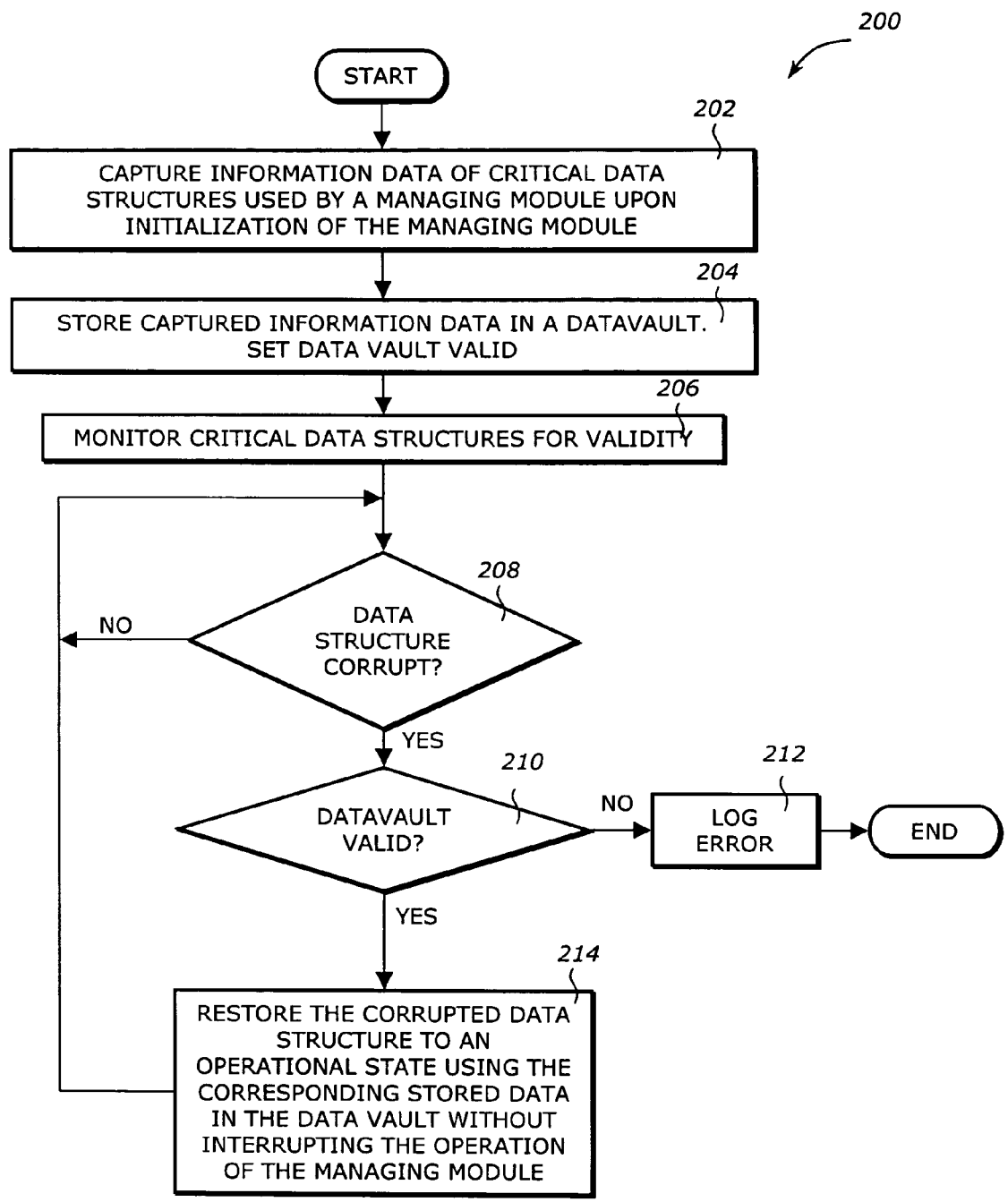
FIG. 2 is a flowchart illustrating the method of the present invention.

FIG. 2 is a flowchart illustrating the method of the present invention. Upon Start, process 200 captures information data of critical data structures used by a managing module upon initialization (or instantiation) of the managing module, the captured information data being considered valid (block 202). Process 200 stores the captured information data in a data vault and sets the data vault valid (block 204). Process 200 then monitors for validity the critical data structures that are used by the managing module during operation of the managing module (block 206). Process 200 checks whether a corruption of a critical data structure occurs (block 208). If there is none, process 200 goes back to block 206 to continue to monitor the critical data structures. Otherwise, process 200 checks whether the data vault is valid (block 210). If the data vault is not valid, process 200 logs the error (block 212) then terminates. Note that the data vault may become corrupted if there was any data being written into the data vault after the data vault was built (that is, after block 204 was executed). If the data vault is valid, process 200 restores the corrupted data structure to an operational state by using the corresponding stored data in the data vault without interrupting the operation of the managing module (block 214). After the repair is completed, process 200 loops back to block 206 to continue to monitor the critical data structures for validity.

The process of the present invention may be used to repair corrupted queues within the IOU. There are many types of queues, Path Queues, Bus Queues, Unit Queues, Device Active Queues, Active Queues, and Intercept Queues. Typically, these queues contain zero or more IOCBs linked together in a chain. The queue data structure typically comprises a control word, a head pointer which references the first IOCB in the chain, a tail pointer which references the last IOCB in the chain, and finally a lock word. The control word has a bit pattern which identifies the queue type. If the control word is found to be incorrect, first, the address of where the queue is being referenced is validated to ensure that the critical values upon which the queue addressing is based have not been corrupted. If this address is found to be corrupted, it is corrected and the queue access is restarted. If this address is not corrupt or the restarted queue access fails, then the queue is determined to be corrupted and will undergo repair.

The repair action for a queue varies depending on how extensive the corruption is. The first thing done is to lock the queue to ensure that no other process can manipulate the data structure while we are actively fixing it. The control word is repaired to a valid bit pattern if necessary. Then the head and tail pointers are validated. The reference in the head and tail is followed and, if they point to valid IOCBs, they are considered valid. If they do not, they are considered corrupt.

Figure 4:
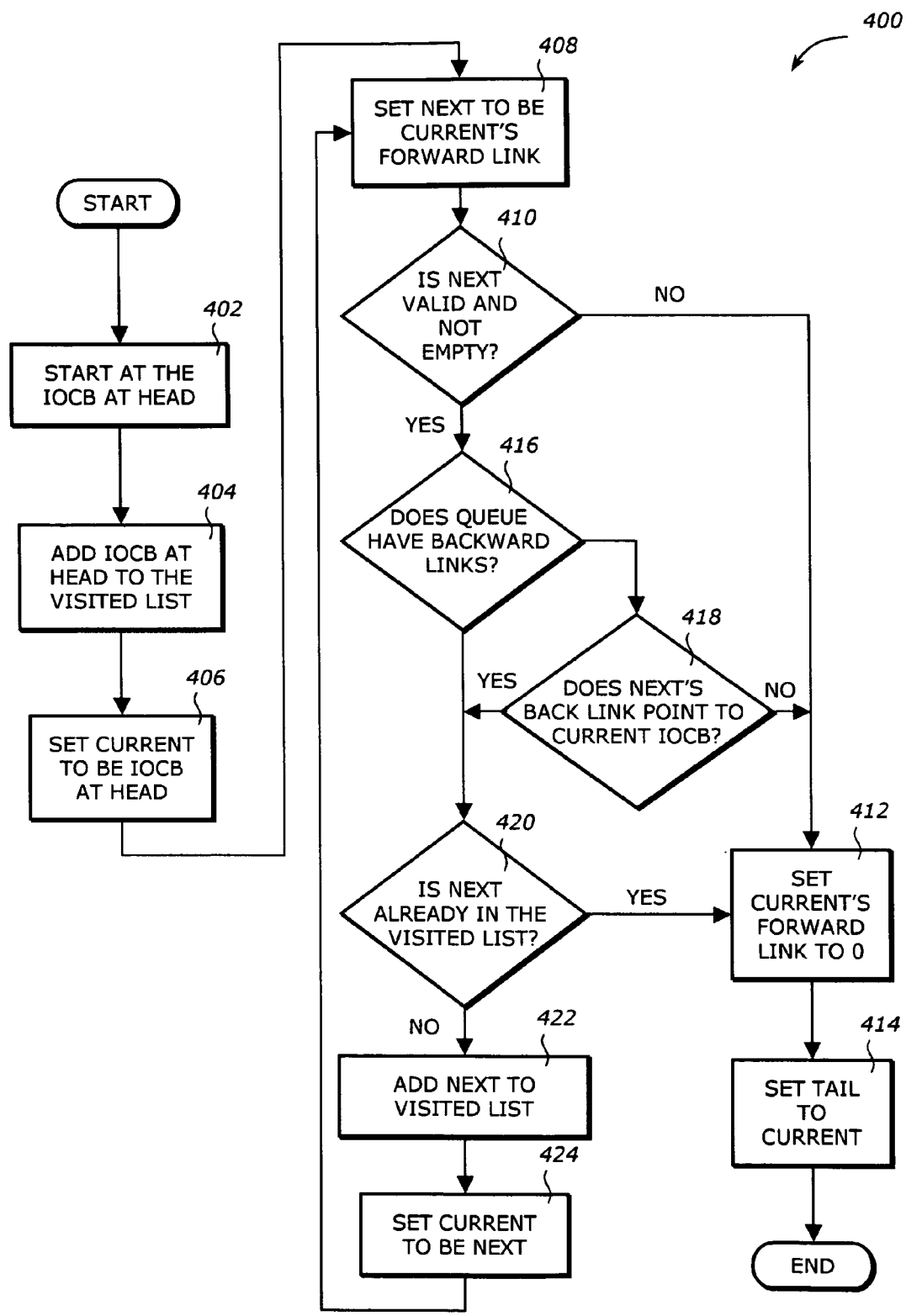
FIG. 4 is a flowchart illustrating an embodiment of the forward queue traversal process (block 318 of FIG. 3).

If just the tail is corrupt, then the forward queue traversal process is invoked to follow the chain of IOCBs from the address referenced by the head through all valid IOCBs with code to ensure that the chain does not loop onto itself. If a link is found which has already been referenced, the chain is broken at the point prior to the second reference, and the tail set to point to the last IOCB in the chain. This will result in the longest possible valid list of IOCBs to be recovered and remain in the queue. FIG. 4 shows a flowchart for an embodiment of the forward queue traversal process.

Figure 5:
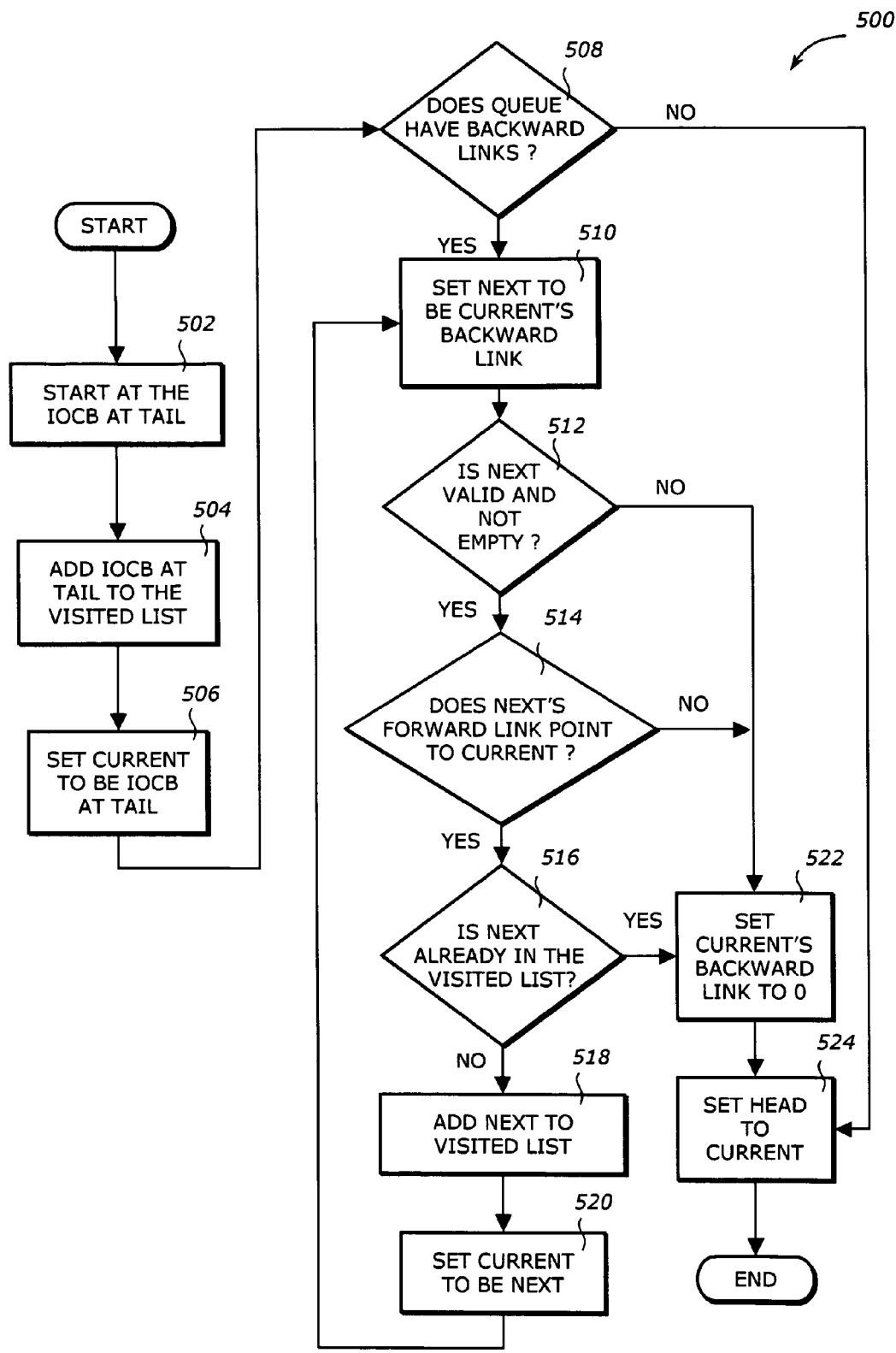
FIG. 5 is a flowchart illustrating an embodiment of the reverse queue traversal process (block 324 of FIG. 3).

If just the head is corrupt, then the backward queue traversal process is invoked to follow the chain backwards from the address referenced by the tail with code to ensure that that the chain does not loop onto itself. If a link is found which has already been referenced, the chain is broken at the point prior to the second reference, i.e., furthest from the tail, and the head is set to point to the first IOCB in the valid chain. This will result in the longest possible valid list of IOCBs to be recovered and remain in the queue. FIG. 5 shows the flowchart for an embodiment of the reverse queue traversal process.

If both the head and tail are corrupt, the head and tail words are reinitialized to zero to indicate an empty queue. Any IOCBs which had been in the queue no longer reside in the queue.

All recovery actions are logged to a file to record any and all recovery actions taken. Event log entries are written to inform the user that a recovery action has been invoked, and if desired, the file may be examined to determine what was corrected.

Once all the recovery action is complete, the queue is unlocked and the IOU continues its normal processing. What would have resulted in a fatal system stop, has been dynamically detected, corrected, and logged.

Figure 3:
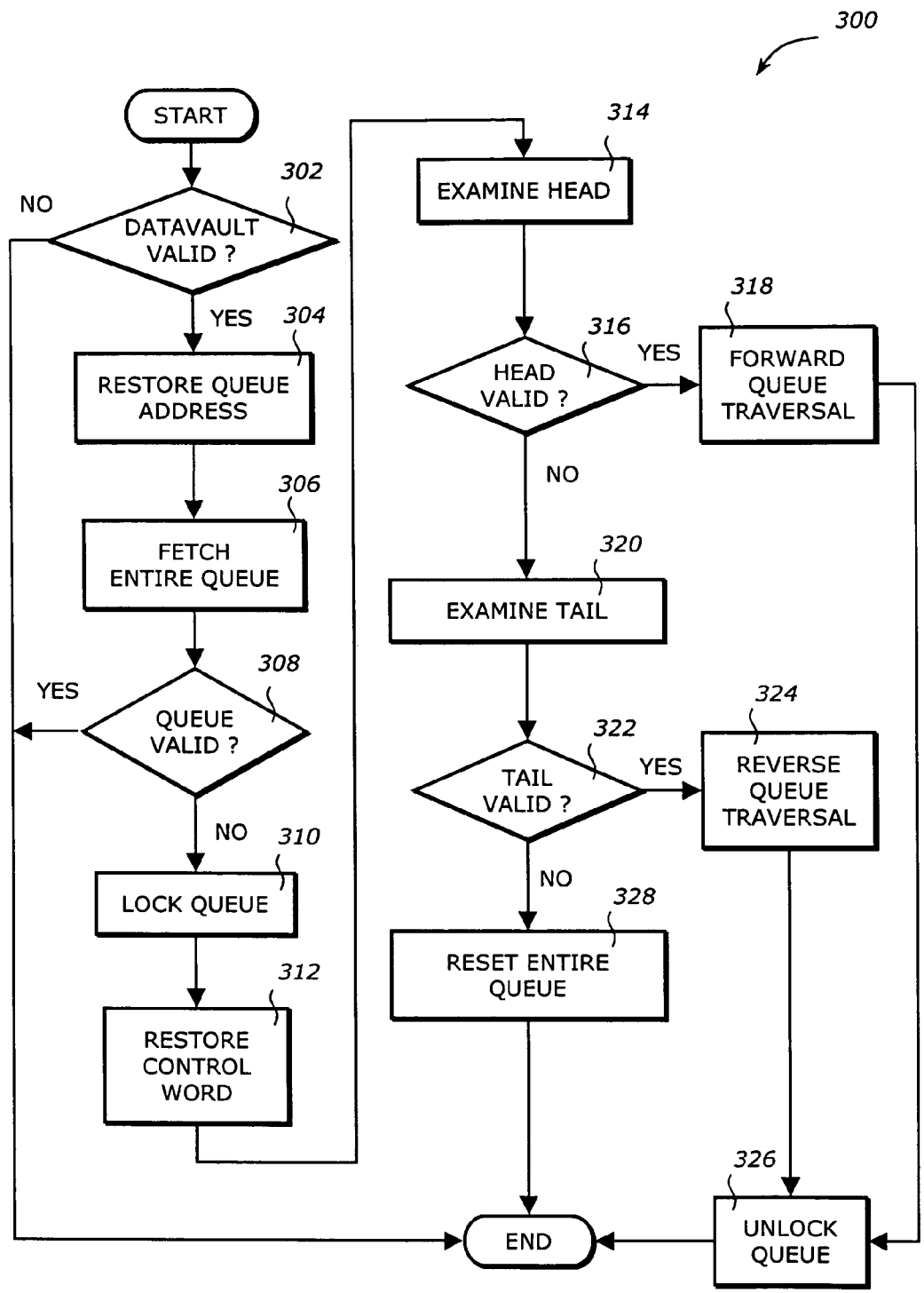
FIG. 3 is a flowchart illustrating an embodiment of the repair process 214 (FIG. 2) that may be used for restoring a corrupted data structure of a queue.

FIG. 3 is a flowchart illustrating an embodiment of the repair process 214 (FIG. 2) that may be used for restoring a corrupted data structure of a queue. Upon Start, process 300 checks whether the data vault is valid (block 302). If it is not valid, process 300 terminates since recovery is not possible. Otherwise, process 300 restores the queue address from the corresponding data stored in the data vault (block 304). Process 300 fetches the entire queue using the queue address (block 306). Process 300 determines whether the queue is valid by checking the control word of the queue (block 308). If the queue is valid, process 300 terminates. If the queue is not valid, process 300 first sets the lock word of the queue to lock the queue to ensure that no other process can manipulate the data structure while process 300 is actively repairing it. (block 310). Next, process 300 restores the control word of the queue (block 312). Note that the control word, which indicates the queue type, can be restored based on the rigid structure of how the queues are set up. Process 300 then examines the head pointer of the queue which contains the address of the first Input Output Control Block (IOCB) in the queue (block 314). Process 300 checks whether the first IOCB is valid (block 316). If it is valid, process 300 performs a forward queue traversal to repair the queue (block 318) then unlocks the queue (block 326) then terminates. If the first IOCB is not valid, process 300 examines the tail pointer of the queue which contains the address of the last Input Output Control Block (IOCB) in the queue (block 320). Process 300 checks whether the last IOCB is valid (block 322). If it is valid, process 300 performs a reversal queue traversal to repair the queue (block 324) then unlocks the queue (block 326) then terminates. If the last IOCB is not valid, process 300 resets the entire queue (block 328) then terminates.

FIG. 4 is a flowchart illustrating an embodiment of the forward queue traversal process (block 318 of FIG. 3). Upon Start, process 400 starts at the first I/O Control Block (IOCB) whose address is referenced by the head pointer (block 402). Process 400 adds the address of the first IOCB to a visited list (block 404). Process 400 sets CURRENT to be the IOCB referenced by the head pointer (block 406). Process 400 sets NEXT to be the IOCB referenced by the forward link of CURRENT (block 408). Process 400 determines whether NEXT is valid and not empty (block 410). If NEXT is not valid or is empty, process 400 sets the forward link of CURRENT to zero (block 412), sets the tail pointer to point to CURRENT (block 414), then terminates. If NEXT is valid and not empty, process 400 determines from the control word of the queue whether the queue is of a type that has backward links (block 416). If the queue has backward links, process 400 determines whether the backward link of NEXT points to CURRENT (block 418). If the backward link of NEXT does not point to CURRENT, process 400 sets the forward link of CURRENT to zero (block 412), sets the tail pointer to point to CURRENT (block 414), then terminates. If the backward link of NEXT points to CURRENT, process 400 checks whether the address of NEXT is already included in the visited list (block 420). If the queue is of a type that does not have backward links, process 400 checks whether the address of NEXT is already included in the visited list (block 420). If the address of NEXT is already included in the visited list, process 400 sets the forward link of CURRENT to zero (block 412), sets the tail pointer to point to CURRENT (block 414), then terminates. If the address of NEXT is not already included in the visited list, process 400 adds the address of NEXT to the visited list (block 422), sets CURRENT to be NEXT (block 424), then goes back to block 408 to proceed as described above.

FIG. 5 is a flowchart illustrating an embodiment of the reverse queue traversal process (block 324 of FIG. 3). Upon Start, process 500 starts at the I/O Control Block (IOCB) whose address is referenced by the tail pointer (block 502). Process 500 adds the address of the IOCB to a visited list (block 504). Process 500 sets CURRENT to be the IOCB referenced by the tail pointer (block 506). Process 500 determines from the control word of the queue whether the queue is of a type that has backward links (block 508). If the queue does not have backward links, process 500 sets the head pointer to point to CURRENT (block 524) then terminates. Otherwise, process 500 sets NEXT to be the IOCB referenced by the backward link of CURRENT (block 510). Process 500 determines whether NEXT is valid and not empty (block 512). If NEXT is not valid or is empty, process 500 sets the backward link of CURRENT to zero (block 522), sets the head pointer to point to CURRENT (block 524), then terminates. If NEXT is valid and not empty, process 500 determines whether the forward link of NEXT points to CURRENT (block 514). If the forward link of NEXT does not point to CURRENT, process 500 sets the backward link of CURRENT to zero (block 522), sets the head pointer to point to CURRENT (block 524), then terminates. If the forward link of NEXT points to CURRENT, process 500 checks whether the address of NEXT is already included in the visited list (block 516). If the address of NEXT is already included in the visited list, process 500 sets the backward link of CURRENT to zero (block 522), sets the head pointer to point to CURRENT (block 524), then terminates. If the address of NEXT is not already included in the visited list, process 500 adds the address of NEXT to the visited list (block 518), sets CURRENT to be NEXT (block 520), then goes back to block 508 to proceed as described above.

FIGS. 6A through 6E further illustrate the forward queue traversal process as applied to an example.

FIG. 6A shows the state of the queue at the start of the forward queue traversal process 400. The head pointer of the queue points to an IOCB located at 0x2e3. The tail pointer of the queue points to an IOCB located at 0x4 cc. There is a corruption in the queue structure since the 4th IOCB in the list has a forward link that does not point to the 5th IOCB in the list. Process 400 adds the address 0x2e3 of the IOCB referenced by the head pointer to the visited list (block 404, FIG. 4), sets CURRENT to be the IOCB referenced by the head pointer (block 406), i.e., the IOCB located at 0x2e3, and sets NEXT to be the IOCB referenced by the forward link of CURRENT (block 408), i.e., the IOCB located at 0xa35. Since NEXT is valid and not empty (block 410), and the queue is of the type that has backward links (block 416), and the backward link of NEXT points to CURRENT (block 418), process 400 checks whether the address of NEXT is already included in the visited list (block 420).

Since the address of NEXT is not already included in the visited list, process 400 adds the address of NEXT, i.e., 0xa35 to the visited list (block 422), as shown in FIG. 6B. Process 400 sets CURRENT to be NEXT (block 424), i.e., the IOCB located at the address 0xa35, and sets NEXT to be to be the IOCB referenced by the forward link of CURRENT (block 408). FIG. 6B illustrates the state of process 400 at this point in time.

Figure 6C:
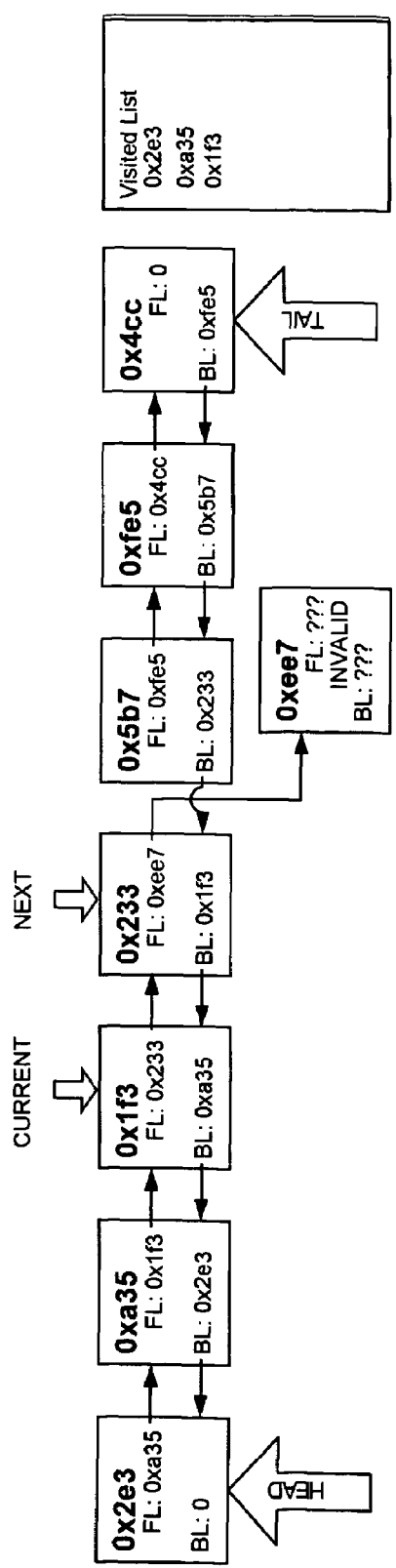
Figure 6D:
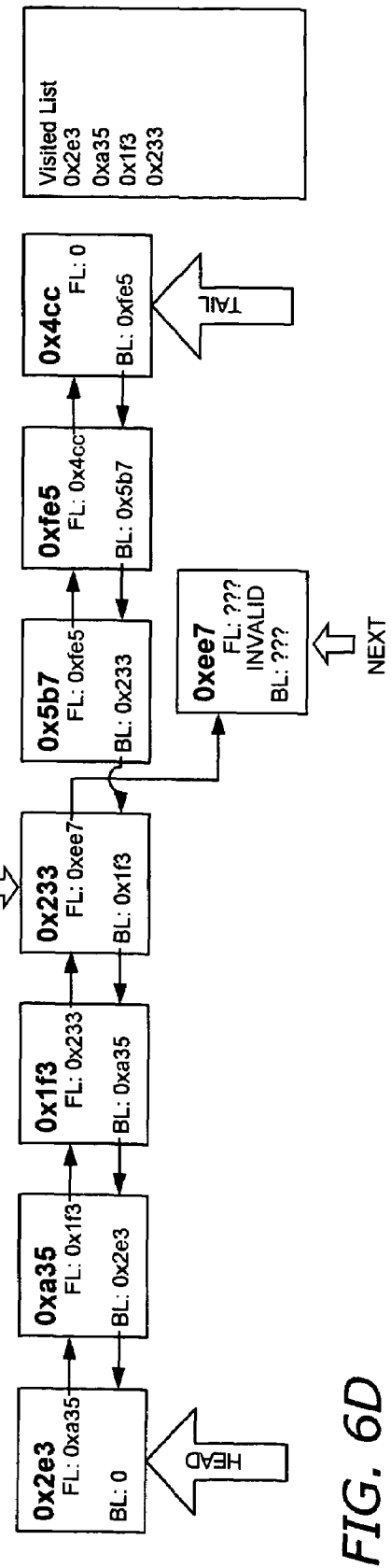

With CURRENT and NEXT positioned as in FIG. 6B, process 400 proceeds from block 408 as before. FIGS. 6C and 6D illustrate the state of process 400 for the next two transitions, respectively.

Figure 6E:
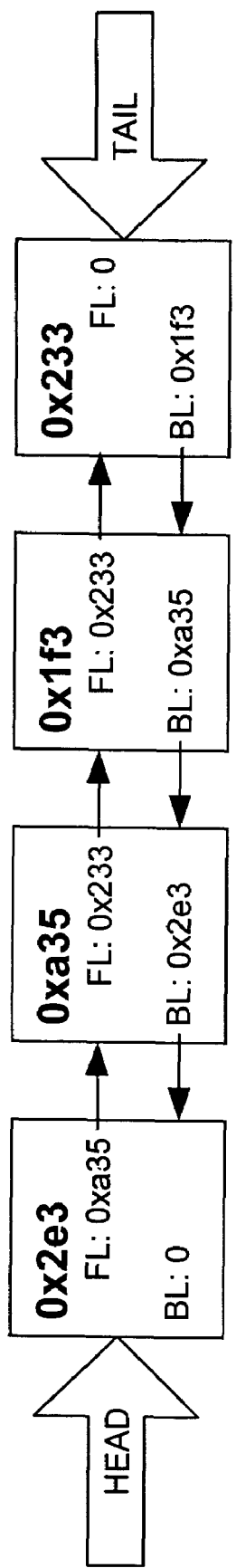

With CURRENT and NEXT positioned as shown in FIG. 6D, when process 400 checks whether the backward link of NEXT points to CURRENT (block 418). the answer is no. Process 400 then sets the forward link of CURRENT to be 0 and sets the tail pointer to point to CURRENT, then terminates. This results in a valid list of IOCBs as shown in FIG. 6E.

Note that the example shows that the forward queue traversal process 400 was able to retain all the IOCBs up to the point of the corruption. The IOCBs which were not recovered will be abandoned. If the abandoned IOCBs are not removed from the device active queue, they will be timed out by the IO subsystem. Once timed out, the operating system may choose to retry the IOCBs.

FIGS. 7A through 7E further illustrate the backward queue traversal process as applied to an example.

Figure 7A:
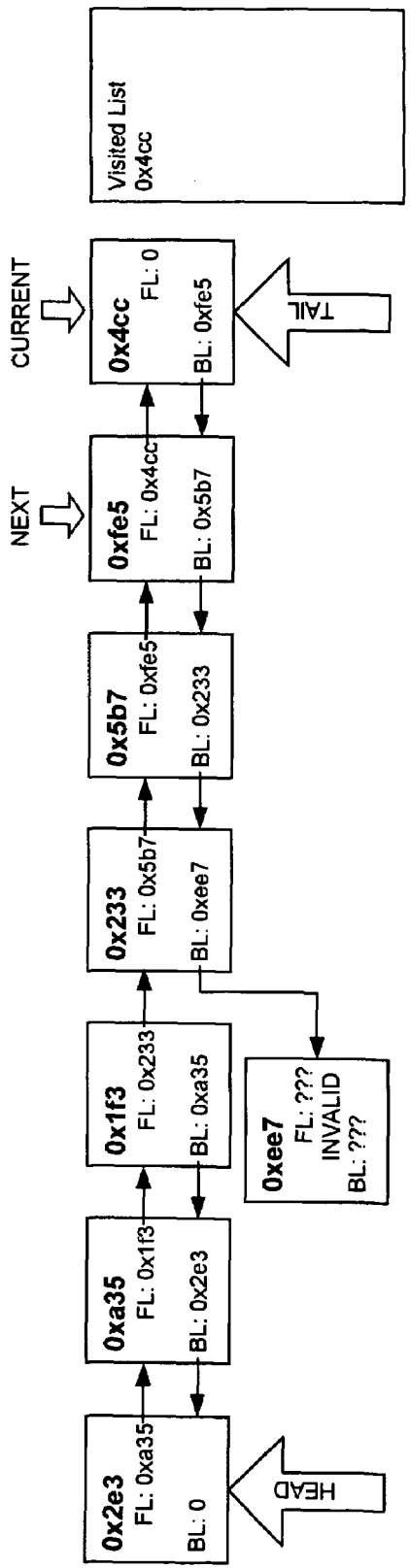

FIG. 7A shows the state of the queue at the start of the backward queue traversal process 500. The head pointer of the queue points to an IOCB located at 0x2e3. The tail pointer of the queue points to an IOCB located at 0x4 cc. There is a corruption in the queue structure since the fourth IOCB in the list has a backward link that does not point to the third IOCB in the list. Process 500 starts at the IOCB located at the address referenced by the tail pointer (block 502). Process 500 adds the address 0x4 cc of the IOCB referenced by the tail pointer to the visited list (block 504), sets CURRENT to be the IOCB referenced by the tail pointer (block 506), i.e., the IOCB located at 0x4 cc. Since this queue is of the type that has backward links (the answer is yes to the question in block 508), process 500 sets NEXT to be the IOCB referenced by the backward link of CURRENT (block 510), i.e., the IOCB located at 0xfe5. Since NEXT is valid and not empty (block 512), and the forward link of NEXT points to CURRENT (block 514), process 500 checks whether the address of NEXT is already included in the visited list (block 516).

Figure 7B:
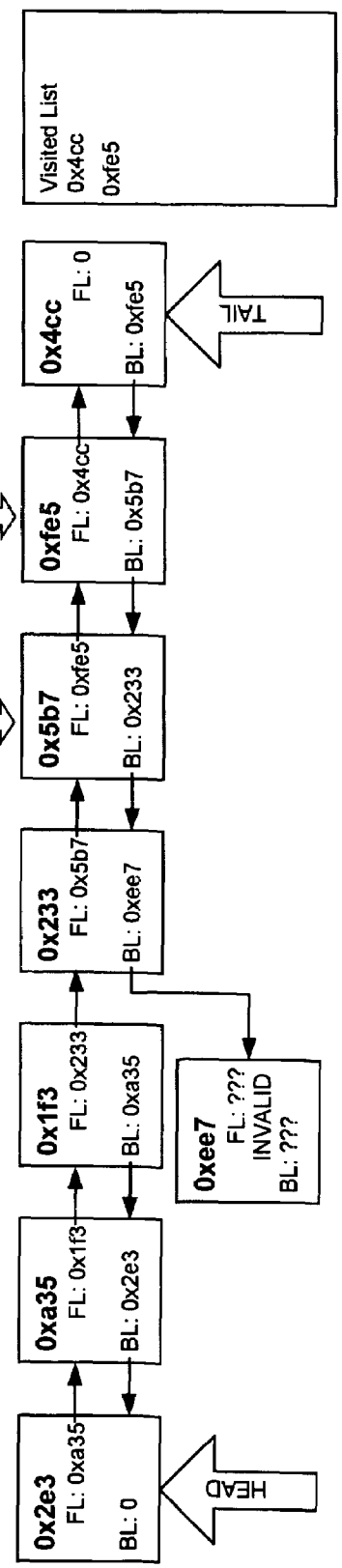

Since the address of NEXT is not already included in the visited list, process 500 adds the address of NEXT, i.e., 0xfe5, to the visited list (block 518), as shown in FIG. 7B. Process 500 sets CURRENT to be NEXT (block 520), i.e., the IOCB located at the address 0xfe5, and sets NEXT to be the IOCB referenced by the backward link of CURRENT (block 510). FIG. 7B illustrates the state of process 500 at this point in time.

With CURRENT and NEXT positioned as in FIG. 7B, process 500 proceeds from block 510 as before. FIGS. 7C and 7D illustrate the state of process 500 for the next two transitions, respectively.

Figure 7E:
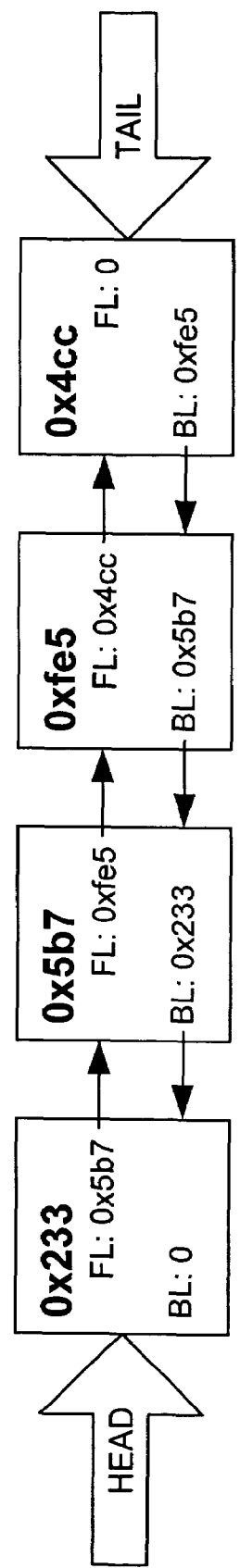

With CURRENT and NEXT positioned as shown in FIG. 7D, when process 500 checks whether the forward link of NEXT points to CURRENT (block 514), the answer is no. Process 500 then sets the backward link of CURRENT to be 0 and sets the head pointer to point to CURRENT, then terminates. This results in a valid list of IOCBs as shown in FIG. 7E. In rebuilding the queue, process 500 has retained all the IOCBs up to the point where the corruption occurred.

Note that the IOCBs that were left out of the rebuilt queue may be recovered by the operating system after they are timed out by the IO subsystem.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A method comprising the operations of:
  (a) capturing information data of critical data structures used by a managing module upon initialization of the managing module, the captured information data being considered valid;
  (b) storing the captured information data in a data vault;
  (c) monitoring data structures used by the managing module for validity during operation of the managing module;
  (d) detecting a corruption of a data structure corresponding to a stored data of the stored captured information data during operation of the managing module; and
  (e) restoring the corrupted data structure to an operational state by using the corresponding stored data in the data vault without interrupting the operation of the managing module.

2. The method of claim 1 wherein the managing module is an emulator of a hardware component.

3. The method of claim 1 wherein the operations of the method are performed by a recovery module included in the managing module.

4. The method of claim 1 wherein operation (b) comprises:
  computing a checksum for the captured information data; and
  storing the checksum along with the captured information data in the data vault.

5. The method of claim 4 wherein storing the checksum includes storing the checksum as the last entry in the data vault.

6. The method of claim 1 wherein operation (b) comprises:
  storing addresses of a plurality of queues.

7. The method of claim 6 wherein storing addresses of a plurality of queues comprises:
  storing a base memory address of each of queuing structures that are used for IO initiation and completion; and
  storing addresses of queues that are not computed from a base memory address and a unit number.

8. The method of claim 6 wherein the corrupted data structure is a corrupted queue data structure and wherein operation (e) comprises:
  restoring address of the corrupted queue data structure from the corresponding stored data in the data vault;
  fetching a queue that corresponds to the restored address; and
  determining validity of the fetched queue, the fetched queue including a head and a tail, the head pointing to a start address, the tail pointing to an end address;
  if the fetched queue is not valid,
    restoring a control word of the fetched queue; and
    checking validity of at least one of the start address and end address.

9. The method of claim 8 wherein operation (e) further comprises:
  if the fetched queue is not valid and if an I/O Control Block (IOCB) whose address is the start address is valid,
    performing forward queue traversal.

10. The method of claim 8 wherein operation (e) further comprises:
  if the fetched queue is not valid and if an I/O Control Block (IOCB) whose address is the end address is valid,
    performing reverse queue traversal.

11. The method of claim 9 wherein performing forward queue traversal comprises:
  (1) starting at a first I/O Control Block (IOCB) whose address is the start address, the first IOCB including a forward link;
  (2) adding the address of the first IOCB to a visited list;
  (3) setting CURRENT to be the first IOCB;
  (4) setting NEXT to be an IOCB pointed to by the forward link of CURRENT;
  (5) determining whether NEXT is valid and not empty;
    if NEXT is valid and not empty,
      if the fetched queue is of a type that has backward links,
  (6) determining whether NEXT has a backward link that points to CURRENT;
      if the fetched queue is of a type that does not have backward links or if NEXT has a backward link that points to CURRENT,
  (7) checking whether the address of NEXT is already included in the visited list; if the address of NEXT is not already included in the visited list,
  (8) adding the address of NEXT to the visited list;

(9) setting CURRENT to be NEXT; and
(10) repeating operation (4) and onward.

12. The method of claim 11 wherein performing forward queue traversal further comprises:
if NEXT is not valid or is empty after operation (5), or if NEXT has a backward link that does not point to CURRENT after operation (6), or if the address of NEXT is already included in the visited list after operation (7), setting the forward link of CURRENT to zero; and setting the tail to point to CURRENT.

13. The method of claim 10 wherein performing reverse queue traversal comprises:
(1) starting at a first I/O Control Block (IOCB) whose address is the end address, the first IOCB having an address and including a forward link and a backward link;
(2) adding the address of the first IOCB to a visited list;
(3) setting CURRENT to be the first IOCB;
(4) determining whether the fetched queue is of a type that has backward links;
if the fetched queue is of a type that has backward links,
(5) setting NEXT to be an IOCB pointed to by the backward link of CURRENT;
(6) determining whether NEXT is valid and not empty;
if NEXT is valid and not empty,
(7) determining whether NEXT has a forward link that points to CURRENT;
if the forward link of NEXT points to CURRENT,
(8) determining whether the address of NEXT is already included in the visited list;
if the address of NEXT is not already included in the visited list,
(8) adding the address of NEXT to the visited list;
(9) setting CURRENT to be NEXT; and
(10) repeating operation (5) and onward.

14. The method of claim 13 wherein performing backward queue traversal further comprises:
if NEXT is not valid or empty after operation (6), or if NEXT has a nonzero forward link that does not point to CURRENT after operation (7), or if the address of NEXT is already included in the visited list after operation (8),
setting the backward link of CURRENT to zero; and
setting the head to point to CURRENT.

15. An article of manufacture comprising:
a machine-accessible storage medium including data that, when accessed by a machine, cause the machine to perform operations comprising:
(a) capturing information data of critical data structures used by a managing module upon initialization of the managing module, the captured information data being considered valid;
(b) storing the captured information data in a data vault;
(c) monitoring validity of data structures used by the managing module during operation of the managing module;
(d) detecting a corruption of a data structure corresponding to a stored data of the stored captured information data during operation of the managing module; and
(e) restoring the corrupted data structure to an operational state by using the corresponding stored data in the data vault without interrupting the operation of the managing module.

16. The article of manufacture of claim 15 wherein the managing module is an emulator of a hardware component.

17. The article of manufacture of claim 15 wherein the data causing the machine to perform the operations are included in a recovery module that is included in the managing module.

18. The article of manufacture of claim 15 wherein the data causing the machine to perform the operation of storing the captured information data comprise data that cause the machine to perform operations comprising:
computing a checksum for the captured information data; and
storing the checksum along with the captured information data in the data vault.

19. The article of manufacture of claim 18 wherein the data causing the machine to perform the operation of storing the checksum comprise data that cause the machine to store the checksum as the last entry in the data vault.

20. The article of manufacture of claim 15 wherein the data causing the machine to perform operation (b) comprise data that cause the machine to perform operations comprising:
storing addresses of a plurality of queues.

21. The article of manufacture of claim 20 wherein the data causing the machine to perform the operation of storing addresses of a plurality of queues comprise data that cause the machine to perform operations comprising:
storing a base memory address of each of queuing structures that are used for IO initiation and completion; and
storing addresses of queues that are not computed from a base memory address and a unit number.

22. The article of manufacture of claim 20 wherein the corrupted data structure is a corrupted queue data structure and wherein the data causing the machine to perform operation (e) comprise data that cause the machine to perform operations comprising:
restoring address of the corrupted queue data structure from the corresponding stored data in the data vault;
fetching a queue that corresponds to the restored address; and
determining validity of the fetched queue, the fetched queue including a head and a tail, the head pointing to a start address, the tail pointing to an end address;
if the fetched queue is not valid,
restoring a control word of the fetched queue; and
checking validity of at least one of the start address and end address.

23. The article of manufacture of claim 22 wherein the data causing the machine to perform operation (e) further comprise data that cause the machine to perform operations comprising:
if the fetched queue is not valid and if an I/O Control Block (IOCB) whose address is the start address is valid,
performing forward queue traversal.

24. The article of manufacture of claim 22 wherein the data causing the machine to perform operation (e) further comprise data that cause the machine to perform operations comprising:
if the fetched queue is not valid and if an I/O Control Block (IOCB) whose address is the end address is valid,
performing reverse queue traversal.

25. The article of manufacture of claim 23 wherein the data causing the machine to perform the operation of performing forward queue traversal comprise data that cause the machine to perform operations comprising:
(1) starting at a first I/O Control Block (IOCB) whose address is the start address, the first IOCB including a forward link;
(2) adding the address of the first IOCB to a visited list;
(3) setting CURRENT to be the first IOCB;
(4) setting NEXT to be an IOCB pointed to by the forward link of CURRENT;
(5) determining whether NEXT is valid and not empty;
if NEXT is valid and not empty, if the fetched queue is of a type that has backward links,
(6) determining whether NEXT has a backward link that points to CURRENT;
if the fetched queue is of a type that does not have backward links or if NEXT has a backward link that points to CURRENT,
(7) checking whether the address of NEXT is already included in the visited list;
if the address of NEXT is not already included in the visited list,
(8) adding the address of NEXT to the visited list;
(9) setting CURRENT to be NEXT; and
(10) repeating previous operations from operation (4) onward.

26. The article of manufacture of claim 25 wherein the data causing the machine to perform the operation of performing forward queue traversal further comprise data that cause the machine to perform operations comprising:
if NEXT is not valid or is empty after operation (5), or if NEXT has a backward link that does not point to CURRENT after operation (6), or if the address of NEXT is already included in the visited list after operation (7), setting the forward link of CURRENT to zero; and setting the tail to point to CURRENT.

27. The article of manufacture of claim 24 wherein the data causing the machine to perform the operation of performing reverse queue traversal comprise data that cause the machine to perform operations comprising:
(1) starting at a first I/O Control Block (IOCB) whose address is the end address, the first IOCB having an address and including a forward link and a backward link;
(2) adding the address of the first IOCB to a visited list;
(3) setting CURRENT to be the first IOCB;
(4) determining whether the fetched queue is of a type that has backward links;
if the fetched queue is of a type that has backward links,
(5) setting NEXT to be an IOCB pointed to by the backward link of CURRENT;
(6) determining whether NEXT is valid and not empty;
if NEXT is valid and not empty,
(7) determining whether NEXT has a forward link that points to CURRENT;
if the forward link of NEXT points to CURRENT,
(8) determining whether the address of NEXT is already included in the visited list;
if the address of NEXT is not already included in the visited list,
(8) adding the address of NEXT to the visited list;
(9) setting CURRENT to be NEXT; and
(10) repeating previous operations from operation (5) onward.

28. The article of manufacture of claim 27 wherein the data causing the machine to perform the operation of performing reverse queue traversal further comprise data that cause the machine to perform operations comprising:
if NEXT is not valid or empty after operation (6), or if NEXT has a nonzero forward link that does not point to CURRENT after operation (7), or if the address of NEXT is already included in the visited list after operation (8),
setting the backward link of CURRENT to zero; and setting the head to point to CURRENT.

29. A system comprising:
a processor;
a plurality of devices having M device types coupled to the processor via a plurality of adapters; and
a memory coupled to the processor, the memory containing program code that, when executed by the processor, causes the processor to:
(a) capture information data of critical data structures used by a managing module upon initialization of the managing module, the captured information data being considered valid;
(b) store the captured information data in a data vault;
(c) monitor validity of data structures used by the managing module during operation of the managing module;
(d) detect a corruption of a data structure corresponding to a stored data of the stored captured information data during operation of the managing module; and
(e) restore the corrupted data structure to an operational state by using the corresponding stored data in the data vault without interrupting the operation of the managing module.

30. The system of claim 29 wherein the managing module is an emulator of a hardware component.

31. The system of claim 29 wherein the program code is included in a recovery module that is included in the managing module.

32. The system of claim 29 wherein the program code causing the processor to store the captured information data comprises program code that causes the processor to:
compute a checksum for the captured information data; and
store the checksum along with the captured information data in the data vault.

33. The system of claim 32 wherein the program code causing the processor to store the checksum comprises program code that cause the processor to store the checksum as the last entry in the data vault.

34. The system of claim 29 wherein the program code causing the processor to store the captured information data in a data vault comprise program code that causes the processor to:
store addresses of a plurality of queues.

35. The system of claim 34 wherein the program code causing the processor to store addresses of a plurality of queues comprise program code that cause the processor to:
store a base memory address of each of queuing structures that are used for IO initiation and completion; and
store addresses of queues that are not computed from a base memory address and a unit number.

36. The system of claim 34 wherein the corrupted data structure is a corrupted queue data structure and wherein the program code causing the processor to restore the corrupted data structure to an operational state comprise program code that cause the processor to:
restore address of the corrupted queue data structure from the corresponding stored data in the data vault;
fetch a queue that corresponds to the restored address; and
determine validity of the fetched queue, the fetched queue including a head and a tail, the head pointing to a start address, the tail pointing to an end address;
if the fetched queue is not valid,
restore a control word of the fetched queue; and
check validity of at least one of the start address and end address.

37. The system of claim 36 wherein the program code causing the processor to restore the corrupted data structure to an operational state further comprise program code that cause the processor to:

if the fetched queue is not valid and if an I/O Control Block (IOCB) whose address is the start address is valid, perform forward queue traversal.

38. The system of claim 36 wherein the program code causing the processor to restore the corrupted data structure to an operational state further comprise program code that cause the processor to:
   if the fetched queue is not valid and if an I/O Control Block (IOCB) whose address is the end address is valid, perform reverse queue traversal.

39. The system of claim 37 wherein the program code causing the processor to perform forward queue traversal comprise program code that cause the processor to:
   (1) start at a first I/O Control Block (IOCB) whose address is the start address, the first IOCB including a forward link;
   (2) add the address of the first IOCB to a visited list;
   (3) set CURRENT to be the first IOCB;
   (4) set NEXT to be an IOCB pointed to by the forward link of CURRENT;
   (5) determine whether NEXT is valid and not empty;
      if NEXT is valid and not empty,
         if the fetched queue is of a type that has backward links,
   (6) determine whether NEXT has a backward link that points to CURRENT;
      if the fetched queue is of a type that does not have backward links or if NEXT has a backward link that points to CURRENT,
   (7) check whether the address of NEXT is already included in the visited list;
      if the address of NEXT is not already included in the visited list,
   (8) add the address of NEXT to the visited list;
   (9) set CURRENT to be NEXT; and
   (10) repeat previous operations from operation (4) onward.

40. The system of claim 39 wherein the program code causing the processor to perform forward queue traversal further comprise program code that cause the processor to:
   if NEXT is not valid or is empty after operation (5), or if NEXT has a backward link that does not point to CURRENT after operation (6), or if the address of NEXT is already included in the visited list after operation (7), set the forward link of CURRENT to zero; and
   set the tail to point to CURRENT.

41. The system of claim 38 wherein the program code causing the processor to perform reverse queue traversal comprise program code that cause the processor to:
   (1) start at a first I/O Control Block (IOCB) whose address is the end address, the first IOCB having an address and including a forward link and a backward link;
   (2) add the address of the first IOCB to a visited list;
   (3) set CURRENT to be the first IOCB;
   (4) determine whether the fetched queue is of a type that has backward links;
      if the fetched queue is of a type that has backward links,
   (5) set NEXT to be an IOCB pointed to by the backward link of CURRENT;
   (6) determine whether NEXT is valid and not empty;
      if NEXT is valid and not empty,
   (7) determine whether NEXT has a forward link that points to CURRENT;
      if the forward link of NEXT points to CURRENT,
   (8) determine whether the address of NEXT is already included in the visited list;
      if the address of NEXT is not already included in the visited list,
   (8) add the address of NEXT to the visited list;
   (9) set CURRENT to be NEXT; and
   (10) repeat previous operations from operation (5) onward.

42. The system of claim 4 wherein the program code causing the processor to perform reverse queue traversal further comprise program code that cause the processor to:
   if NEXT is not valid or empty after operation (6), or if NEXT has a nonzero forward link that does not point to CURRENT after operation (7), or if the address of NEXT is already included in the visited list after operation (8),
      set the backward link of CURRENT to zero; and
   set the head to point to CURRENT.

* * * * *